(12) United States Patent
Siegel et al.

(10) Patent No.: US 9,994,457 B2
(45) Date of Patent: Jun. 12, 2018

(54) SYSTEM AND METHOD FOR AMMONIA DISTILLATION

(71) Applicant: The Boeing Company, Chicago, IL (US)

(72) Inventors: Jason M. Siegel, Rancho Palos Verdes, CA (US); Wen-teh Chen, Costa Mesa, CA (US); Steven J. Adam, Orange, CA (US)

(73) Assignee: The Boeing Company, Chicago, IL (US)

( * ) Notice: Subject to any disclaimer, the term of this patent is extended or adjusted under 35 U.S.C. 154(b) by 833 days.

(21) Appl. No.: 14/246,513

(22) Filed: Apr. 7, 2014

(65) Prior Publication Data
US 2015/0284256 A1 Oct. 8, 2015

(51) Int. Cl.
*C01C 1/10* (2006.01)
*C01C 1/02* (2006.01)

(52) U.S. Cl.
CPC ............... *C01C 1/10* (2013.01); *C01C 1/022* (2013.01); *C01C 1/024* (2013.01)

(58) Field of Classification Search
CPC .. C01C 1/02–1/14; C01C 1/022; C01C 1/024; C01C 1/10
USPC .................................. 423/352, 237
See application file for complete search history.

(56) References Cited

U.S. PATENT DOCUMENTS

| 1,012,272 | A | 12/1911 | Pennock | |
| 2,038,562 | A * | 4/1936 | Harvey | C01C 1/00 252/372 |
| 2,108,914 | A | 2/1938 | Bennett | |
| 2,501,326 | A | 3/1950 | Gilmore | |
| 2,519,451 | A | 8/1950 | David | |
| 3,054,726 | A * | 9/1962 | Fields | C01C 1/12 95/168 |
| 4,318,782 | A * | 3/1982 | Pagani | C01B 3/025 203/12 |
| 4,323,430 | A * | 4/1982 | Glassman | B01D 3/38 203/11 |
| 5,722,442 | A | 3/1998 | Hoffman et al. | |
| 6,482,297 | B1 | 11/2002 | Bocquenet et al. | |
| 7,371,313 | B2 * | 5/2008 | Del Prato | B01D 53/79 205/552 |
| 2002/0124728 | A1 * | 9/2002 | Benderly | B01J 8/006 95/183 |
| 2006/0005704 | A1 * | 1/2006 | Zhou | B01D 53/02 95/117 |

(Continued)

OTHER PUBLICATIONS

Liu, David H. F., and Bela G. Liptak. "3.10 Process Modifications." Environmental Engineers' Handbook, 2nd edition. Boca Raton, Fla: Chapman & Hall, 1999. pp. 149-158. Print.*

(Continued)

*Primary Examiner* — Bobby Ramdhanie
*Assistant Examiner* — Briana M Obenhuber
(74) *Attorney, Agent, or Firm* — Walters & Wasylyna LLC (57) ABSTRACT

A system for ammonia distillation may include a condenser to condense ammonia vapor into liquid anhydrous ammonia, a flush tank to receive a flushed portion of the liquid anhydrous ammonia, a collection tank to receive a collected portion of the liquid anhydrous ammonia, and a corrosion inhibitor dispenser to transfer a corrosion inhibitor to the collected portion of the liquid anhydrous ammonia to form corrosion-inhibiting liquid anhydrous ammonia.

20 Claims, 9 Drawing Sheets

(56) References Cited

U.S. PATENT DOCUMENTS

2014/0262732 A1* 9/2014 Conway .................... F25J 3/08
203/4

OTHER PUBLICATIONS

Loginow, A. W. "Stress Corrosion Cracking of Steel in Liquefied Ammonia Service—A Recapitulation." N.p., Dec. 20, 2010. <https://web.archive.org/web/20101220140218/http://www.nationalboard.org/index.aspx?pageID=164&ID=182>.*

* cited by examiner

SYSTEM AND METHOD FOR AMMONIA DISTILLATION

GOVERNMENT RIGHTS

The disclosed invention was made with government support under Contract No. FA8002-12-G-0540 awarded by the United States Air Force (SAF/AQC). The government has certain rights in the disclosed invention.

FIELD

The present disclosure is generally related to ammonia distillation and, more particularly, to a system and method for ammonia distillation, for example, yielding high purity ammonia, ultra-high purity ammonia and corrosion-inhibiting ammonia.

BACKGROUND

Numerous applications require high purity or ultra-high purity ammonia (e.g., having low water content). Typically, higher purities of ammonia are achieved through a distillation process. However, conventional distillation processes may not yield ammonia of sufficient purity. Often the actual purity levels achieved are well below a predicted purity. Thus, additional distillation cycles may be needed to further increase the purity of the distilled ammonia.

However, in conventional ammonia distillation processes, intrinsic system contaminants and/or environmental contaminants may be introduced to the distilled ammonia from the distillation system. For example, contamination (e.g., moisture, chlorides and the like) from the internal surfaces of the distillation system or from the exterior environment may be introduced to the ammonia in its vapor form and/or its liquid form as the ammonia passes through the distillation system. Maintaining an internally clean system and preventing exterior contamination from entering the system may be a difficult process. Additionally, environmental contamination may be introduced to the distilled ammonia during transfer of the distilled ammonia between distillation cycles.

Further, contaminated ammonia may be corrosive to metal material (e.g., aluminum, copper and the like). Such corrosive attacks may damage ammonia distillation systems or other end use systems utilizing high purity ammonia.

Accordingly, those skilled in the art continue with research and development efforts in the field of ammonia distillation for use in high purity applications.

SUMMARY

In one embodiment, the disclosed system for ammonia distillation may include a condenser to condense ammonia vapor into liquid anhydrous ammonia, a flush tank to receive a flushed portion of the liquid anhydrous ammonia and a collection tank to receive a collected portion of the liquid anhydrous ammonia.

In another embodiment, the disclosed system for ammonia distillation may include a corrosion inhibitor transferred to the collected portion of the liquid anhydrous ammonia to form corrosion-inhibiting liquid anhydrous ammonia.

In another embodiment, also disclosed is a method for ammonia distillation, the method may include the steps of: (1) condensing ammonia vapor to form liquid anhydrous ammonia, (2) discarding a flushed portion of the liquid anhydrous ammonia and (3) collecting a collected portion of the liquid anhydrous ammonia.

In another embodiment, the disclosed method for ammonia distillation may include the step of: (4) transferring a corrosion inhibitor to the collected portion of the liquid anhydrous ammonia to form corrosion-inhibiting liquid anhydrous ammonia.

In yet another embodiment, also disclosed is a method for inhibiting corrosion in an ammonia distillation system, the method may include the steps of: (1) providing a source of liquid ammonia, (2) evaporating the liquid ammonia to form ammonia vapor, (3) condensing the ammonia vapor to form liquid anhydrous ammonia, (4) collecting at least a portion of the liquid anhydrous ammonia and (5) transferring a corrosion inhibitor to the portion of the liquid anhydrous ammonia to form corrosion-inhibiting liquid anhydrous ammonia.

Other embodiments of the disclosed system and method will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
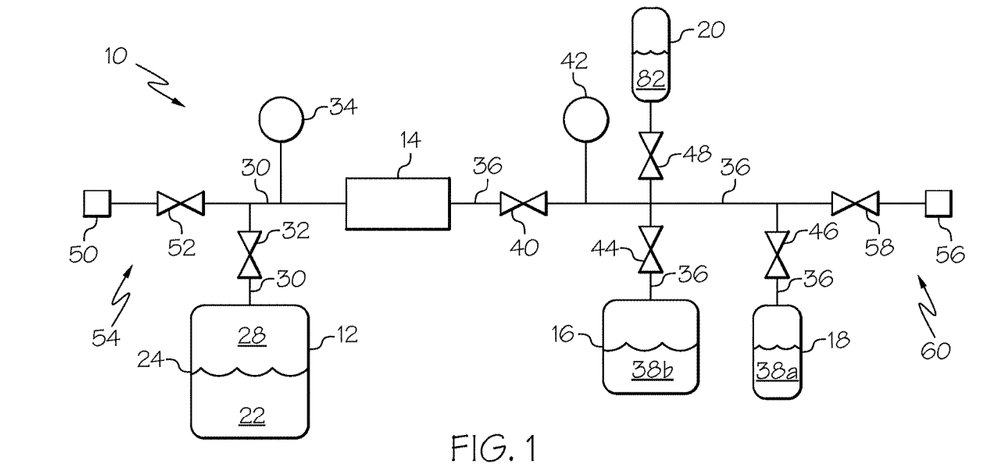
FIG. 1 is a schematic illustration of one embodiment of the disclosed system for ammonia distillation.

Referring to FIG. 1, one embodiment of the disclosed system, generally designated 10, for ammonia distillation may include a liquid ammonia source 12, a condenser 14, a collection tank 16, a flush tank 18 and a corrosion inhibitor dispenser 20. The liquid ammonia source 12 may provide ammonia vapor 28. For example, liquid ammonia 22 may be provided within a storage tank 24. The liquid ammonia 22 may be evaporated to form ammonia vapor 28 within the storage tank 24.

The disclosed system 10 may be completely closed (e.g., segregated) to minimize or substantially eliminate cross-contamination between components of the system 10 and/or minimize or substantially eliminate introduction of environmental contamination into the system 10. The system 10 may also be configured to be pre-cleaning to remove any internal contamination prior to a distillation process.

Figure 2:
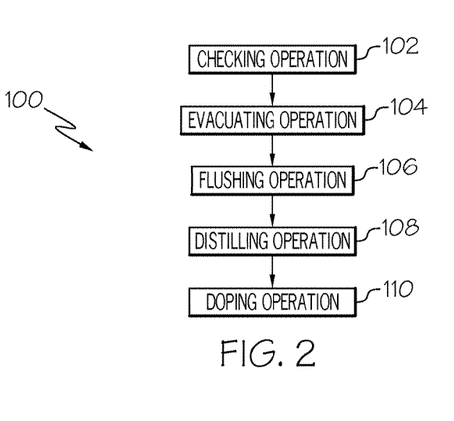
FIG. 2 is a block diagram illustrating one embodiment of the disclosed method for ammonia distillation.

Referring to FIG. 2, one embodiment of the disclosed method, generally designated 100, for ammonia distillation may include a checking operation 102, an evacuating operation 104, a flushing operation 106, a distilling operation 108 and a doping operation 110.

The disclosed method 100 may distill liquid ammonia 22 (FIG. 1) and yield liquid anhydrous ammonia (e.g., high purity or ultra-high purity ammonia) as a distillate. The liquid anhydrous ammonia may include a higher purity (e.g., lower concentration of water and/or contamination) than the liquid ammonia 22 of the liquid ammonia source 12 (FIG. 1) while minimizing introduction of environmental contamination.

As an example, the disclosed system 10 (FIG. 1) and method 100 (FIG. 2) may reduce moisture (e.g., water content) in liquid anhydrous ammonia to below 10 ppm. As another example, the disclosed system 10 and method 100 may reduce moisture in liquid anhydrous ammonia to below 5 ppm. As another example, the disclosed system 10 and method 100 may reduce moisture in liquid anhydrous ammonia to below 1 ppm. As another example, the disclosed system 10 and method 100 may reduce moisture in liquid anhydrous ammonia to below 0.05 ppm. As another example, the disclosed system 10 and method 100 may reduce moisture in liquid anhydrous ammonia to below 0.01 ppm. As yet another example, the disclosed system 10 and method 100 may reduce moisture in liquid anhydrous ammonia to below 1 ppb.

Referring again to FIG. 1, in an example construction, the liquid ammonia source 12 (e.g., the storage tank 24) may be fluidly coupled to a vapor transfer line 30. The storage tank 24 may be removable from the vapor transfer line 30. The storage tank 24 may be oriented such that only ammonia vapor 28 exits the storage tank 24 into the vapor transfer line 30. For example, the storage tank 24 may be positioned in a generally vertical (e.g., straight up) orientation and a connection between the storage tank 24 and the vapor transfer line 30 may be positioned above the liquid ammonia 22 stored within an interior volume of the storage tank 24.

The vapor transfer line 30 may be any suitable fluid transfer tubing. The material construction of the vapor transfer line 30 may be selected to minimize or substantially eliminate the addition of any environmental contamination to the ammonia vapor 28 within the system 10 and/or reduce initiation of corrosive attack. As a general, non-limiting example, the vapor transfer line 30 may include a highly polished or fine interior surface. As a specific, non-limiting example, the vapor transfer line 30 may be electropolished 300 series stainless steel tubing (e.g., 316 stainless steel tubing).

The size (e.g., diameter) of the vapor transfer line 30 may be selected to minimize the wetted surface area (e.g., the internal contact surface area) while providing an adequate flow rate. As an example, the vapor transfer line 30 may include a diameter of up to 1 inch. As another example, the vapor transfer line 30 may include a diameter of up to ½ inch. As yet another example, the vapor transfer line 30 may include a diameter of up to ⅛ inch.

The vapor transfer line 30 may be fluidly coupled to a fluid input port (not shown) of the condenser 14. The condenser 14 may be any device suitable to condense ammonia vapor 28 to liquid anhydrous ammonia. For example, the condenser 14 may include a heat exchanger to reduce the temperature of the ammonia vapor 28 to a condensation temperature. As a specific, non-limiting example, the condenser 14 may include a concentric coil heat exchanger.

A valve 32 may be located on the vapor transfer line 30 between the liquid ammonia source 12 and the condenser 14 to control the flow of ammonia vapor 28 (e.g., from the storage tank 24). A pressure gauge 34 may be located on the vapor transfer line 30 (e.g., between the valve 32 and the condenser 14) to measure the pressure within the vapor transfer line 30. For example, the pressure gauge 34 may be a hermetically sealed metal membrane pressure transducer suitable for precision distillation.

In another example construction (not shown), the valve 32 may be connected directly to the liquid ammonia source 12 (e.g., the storage tank 24). For example, the valve 32 may be connected (e.g., threadably connected) directly to the liquid ammonia source 12. The valve 32 may be removably connected to the vapor transfer line 30.

A liquid transfer line 36 may be fluidly coupled to a fluid outlet port (not shown) of the condenser 14. The liquid transfer line 36 may be any suitable fluid transfer tubing. The material construction of the liquid transfer line 36 may be selected to minimize or substantially eliminate the addition of any environmental contamination to the liquid anhydrous ammonia (e.g., the distillate) within the system 10 and/or reduce initiation of corrosive attack. As a general, non-limiting example, the vapor transfer line 30 may include a highly polished or fine interior surface. As a specific, non-limiting example, the liquid transfer line 36 may be electropolished 300 series stainless steel tubing (e.g., 316 stainless steel tubing).

The size (e.g., diameter) of the liquid transfer line 36 may be selected to minimize the wetted surface area (e.g., the internal contact surface area) while providing an adequate flow rate. As an example, the liquid transfer line 36 may include a diameter of up to 1 inch. As another example, the liquid transfer line 36 may include a diameter of up to ½ inch. As yet another example, the liquid transfer line 36 may include a diameter of up to ⅛ inch.

The liquid transfer line 36 may be fluidly coupled to the collection tank 16 and the flush tank 18. A flushed portion (e.g., a first portion) of the liquid anhydrous ammonia 38a may be collected in the flush tank 18. A collected portion (e.g., a second portion) of the liquid anhydrous ammonia 38b may be collected in the collection tank 16.

The flush tank 18 may include a volume suitable to receive and store approximately three times the volume of the flushed portion of the liquid anhydrous ammonia 38a to flow through the system 10 (e.g., exiting the condenser 14). For example, the flush tank 18 may include a volume of approximate 25 times the total volume of the vapor transfer line 30 and the liquid transfer line 36.

A valve 40 may be located on the liquid transfer line 36 to control the flow of liquid anhydrous ammonia from the condenser 14. A pressure gauge 42 may be located on the liquid transfer line 36 (e.g., between the valve 40 and the collection tank 16 and flush tank 18) to measure the pressure within the liquid transfer line 36. For example, the pressure gauge 42 may be a hermetically sealed metal membrane pressure transducer suitable for precision distillation.

A valve 44 may be located on the liquid transfer line 36 to control the flow of liquid anhydrous ammonia into the collection tank 16. A valve 46 may be located on the liquid transfer line 36 to control the flow of liquid anhydrous ammonia into the flush tank 18.

In another example construction (not shown), the valve 44 may be connected directly to the collection tank 16 and the valve 46 may be connected directly to the flush tank 18. The valves 44, 46 may be removably connected to respective sections of the liquid transfer line 36.

The corrosion inhibitor dispenser 20 may store a corrosion inhibitor 82. The corrosion inhibitor 82 may be added to the collected portion of the liquid anhydrous ammonia 38b to mitigate the risk of corrosion to metallic materials (e.g., aluminum) that may later utilize the collected portion of the liquid anhydrous ammonia 38b. Certain contaminants, for example, chloride, cannot be entirely removed (e.g., physically removed) from the collected portion of the liquid anhydrous ammonia 38b. For example, a residual amount of contamination may be solvated by the ammonia (e.g., the liquid anhydrous ammonia). The corrosion inhibitor 82 may neutralize the contaminants that lead to corrosive attacks.

The corrosion inhibitor 82 may include alkaline salt, hydroxide or a combination of alkaline salt and hydroxide. The corrosion inhibitor 82 may be anhydrous (e.g., provided in a dry form), for example, as a powder or pellet, to eliminate introduction of water to the collected portion of the liquid anhydrous ammonia 38b. The anhydrous corrosion inhibitor 82 may be solvated or solubilized by the collected portion of the liquid anhydrous ammonia 38b.

Thus, addition of the corrosion inhibitor 82 to at least a portion of the liquid anhydrous ammonia (e.g., the collected portion of the liquid anhydrous ammonia 38b) may yield corrosion-inhibiting liquid anhydrous ammonia. The corrosion-inhibiting liquid anhydrous ammonia may be utilized in additional ammonia distillation cycles or other end uses. The corrosion-inhibiting liquid anhydrous ammonia may substantially reduce corrosive attacks by ammonia (e.g., in its vapor or liquid form) on metals susceptible to attack by ammonia (e.g., aluminum).

In an example implementation, the corrosion inhibitor 82 may be added to the collected portion of the liquid anhydrous ammonia 38b at a concentration of approximately between 1 ppb and 1 ppm. In another example implementation, the corrosion inhibitor 82 may be added to the collected portion of the liquid anhydrous ammonia 38b at a concentration of approximately between 10 ppm and 1 ppm.

As will be described in more detail herein, the corrosion inhibitor dispenser 20 may actively transfer (e.g., dispense) the corrosion inhibitor 82 to the collected portion of the liquid anhydrous ammonia 38b upon collection in the collection tank 16 or passively transfer (e.g., mix) the corrosion inhibitor 82 with the collected portion of the liquid anhydrous ammonia 38b prior to collection in the collection tank 16. At least one valve 48 may be located between the corrosion inhibitor dispenser 20 and the liquid transfer line 36 and/or the collection tank 16 to control the flow of the corrosion inhibitor 82.

The system 10 may include a test port 50 fluidly coupled to the vapor transfer line 30 at an upstream end 54. A valve 52 may be located on the vapor transfer line 30 (e.g., proximate the upstream end 54) to control fluid flow into and out from the test port 50.

The system 10 may include a vacuum port 56 fluidly coupled to the liquid transfer line 36 at a downstream end 60. A valve 58 located on the liquid transfer line 36 (e.g., proximate the downstream end 60) to control fluid flow into and out from the vacuum port 56.

The valves 32, 40, 44, 46, 48, 58 and pressure gauges 34, 42 may be constructed from materials compatible with ammonia, for example, 300 series stainless steel with polytetrafluoroethylene (PTFE) seals.

Figure 3:
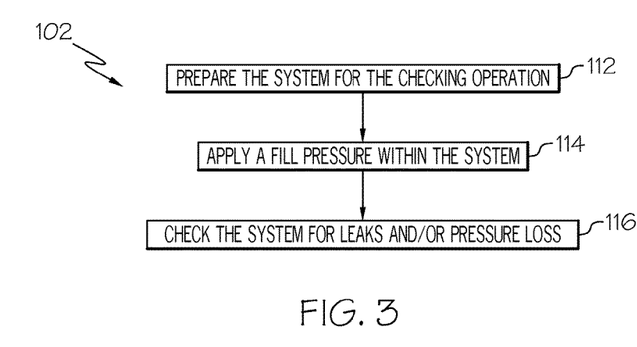
FIG. 3 is a block diagram illustrating an example implementation of the checking operation of the method of FIG. 2.
Figure 4:
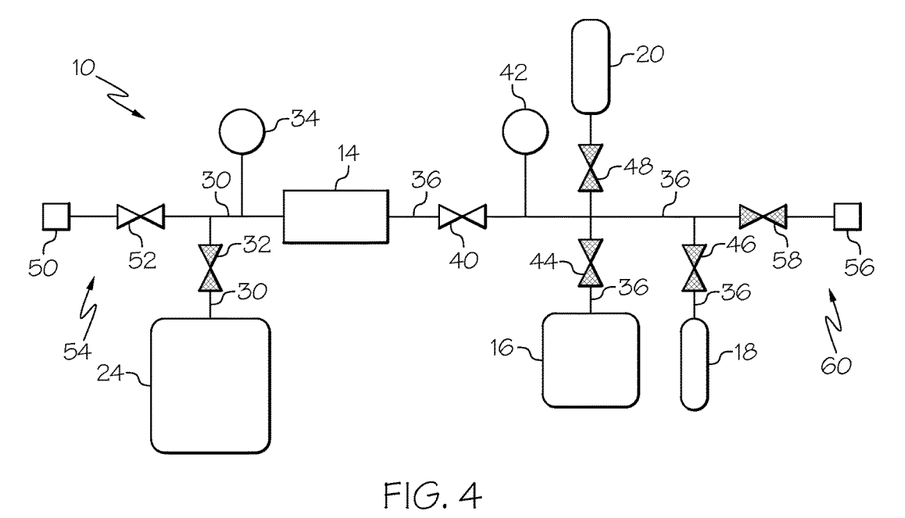
FIG. 4 is a schematic illustration of the system of FIG. 1 during the checking operation of FIG. 3.

Referring to FIG. 3 and with reference to FIG. 4, in an example implementation of the disclosed method 100 may begin with the checking operation 102. The checking operation 102 may begin with the step of preparing the system 10 for the checking operation by opening and/or closing portions of the system 10, as shown at block 112. For example, valve 32 may be closed to prevent fluid flow to the storage tank 24, valve 44 may be closed to prevent fluid flow to the collection tank 16, valve 46 may be closed to prevent fluid flow to the flush tank 18, valve 48 may be closed to prevent fluid flow to the corrosion inhibitor dispenser 20 and valve 58 may be closed to prevent fluid flow out of the system 10 (e.g., through the vacuum port 56). Valve 40 may be opened to allow fluid flow through the liquid transfer line 36, the condenser 14 and the vapor transfer line 30 and valve 52 may be opened to allow fluid flow into the system 10 (e.g., through the test port 50).

As shown at block 114, a fill pressure may be applied within the system 10. A fill pressure may be applied to the system 10 by fluidly coupling a test mechanism (not shown) to the test port 50. The test mechanism may fill the vapor transfer line 30, the condenser 14 and the liquid transfer line 36 with a pressurized gas (e.g., an inert gas, helium, ammonia vapor or the like).

As shown at block 116, the system 10 may be checked for leaks and/or pressure loss. For example, the vapor transfer line 30, the condenser 14, the liquid transfer line 36 and valves 32, 44, 46, 48 and 58 may be checked for leaks by detecting gas escaping from the system 10. The pressure gauges 34, 42 may provide indication of a loss of pressure in the system 10.

Figure 5:
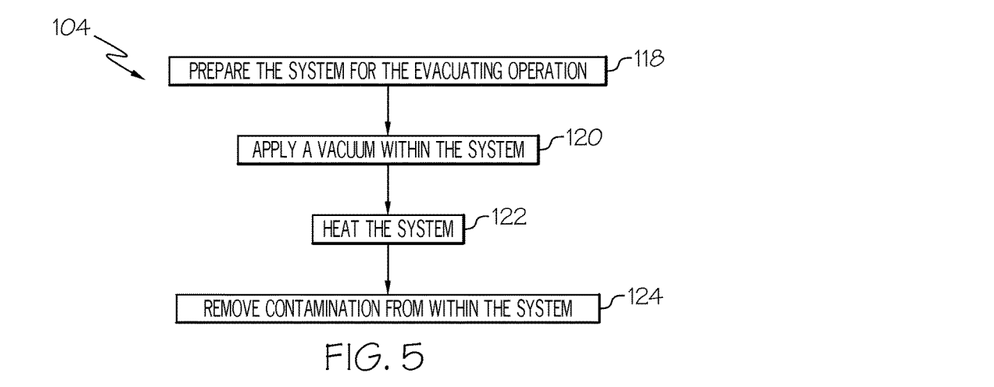
FIG. 5 is a block diagram illustrating an example implementation of the evacuating operation of the method of FIG. 2.
Figure 6:
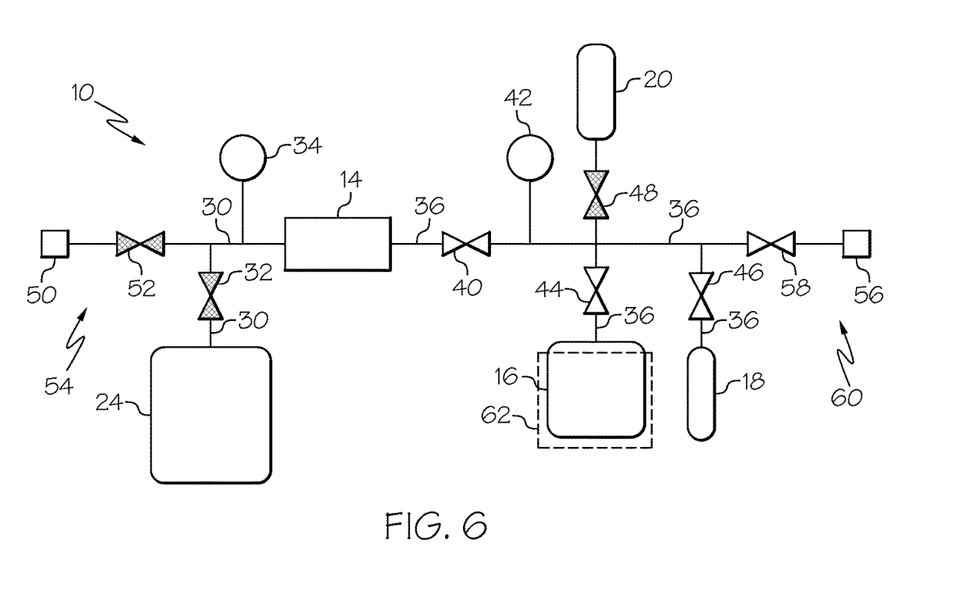
FIG. 6 is a schematic illustration of the system of FIG. 1 during the evacuating operation of FIG. 5.

Referring to FIG. 5 and with reference to FIG. 6, the disclosed method 100 may continue with the evacuating operation 104. The evacuating operation 104 may begin with the step of preparing the system 10 for the evacuating operation by opening and/or closing portions of the system 10, as shown at block 118. For example, valve 52 may be closed to prevent fluid flow into the system 10 (e.g., through the test port 50), valve 32 may be closed to prevent fluid flow from the storage tank 24 and valve 48 may be closed to prevent fluid flow from the corrosion inhibitor dispenser 20. Valve 40 may be opened to allow fluid flow through the liquid transfer line 36, the condenser 14 and the vapor transfer line 30, valve 44 may be opened to allow fluid flow from the collection tank 16, valve 46 may be opened to allow fluid flow from the flush tank 18 and valve 58 may be opened to allow fluid flow out of the system 10 (e.g., through the vacuum port 56.)

As shown at block 120, a vacuum may be applied within the system 10. For example, a partial vacuum may be applied to the system 10 by fluidly coupling a vacuum device (e.g., a vacuum pump) (not shown) to the vacuum port 56. The vacuum may draw a vacuum pressure within the vapor transfer line 30, the condenser 14, the liquid transfer line 36, the collection tank 16 (e.g., an empty collection tank) and the flush tank 18 (e.g., an empty flush tank).

As shown at block 122, optionally, at least a portion of the system 10 may be heated to evaporate substantially all of any liquid ammonia (e.g., condensation) disposed in the vapor transfer line 30 or liquid anhydrous ammonia (e.g., distillate) disposed in the liquid transfer line 36. Heating the system 10 may remove (e.g., "bake out") any moisture present within the system 10. For example, the heat may boil any moisture (e.g., atmospheric moisture) clinging to the interior walls of the system 10. The vacuum may then remove any moisture vapor out of the system 10.

For example, the vapor transfer line 30, the liquid transfer line 36 and/or the collection tank 16, may be heated. In an example construction, a heater 62 may be thermally coupled to the collection tank 16 to evaporate substantially all of any remaining liquid anhydrous ammonia (e.g., the collected portion of the liquid anhydrous ammonia 38b) within an internal volume of the collection tank 16. The heater 62 may be any suitable heating mechanism. For example, the heater 62 may be a heating jacket positioned around at least a portion of an exterior of the collection tank 16.

As shown at block 124, substantially all of the contamination (e.g., vaporized moisture, environmental contamination and/or particulate material mixed in the air within the system 10) may be removed from within the system 10. For example, heating at least a portion of the system 10 (e.g., block 120) and applying the vacuum (e.g., block 122) may occur substantially simultaneously or concurrently to remove the contamination from the system 10. For example, substantially all of any contamination within the vapor transfer line 30, the condenser 14, the liquid transfer line 36, the collection tank 16 and the flush tank 18 may be removed through the vacuum port 56.

Figure 7:
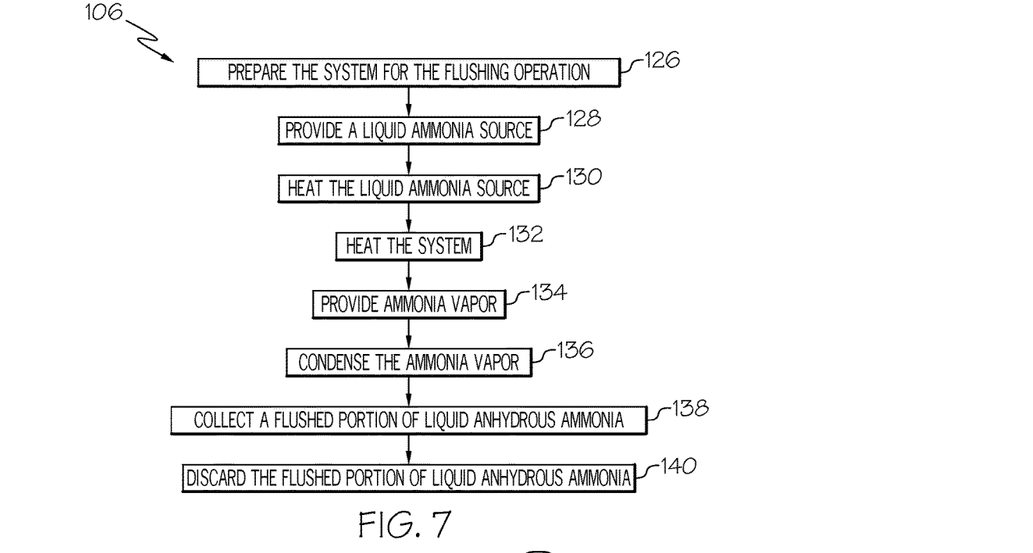
FIG. 7 is a block diagram illustrating an example implementation of the flushing operation of the method of FIG. 2.
Figure 8:
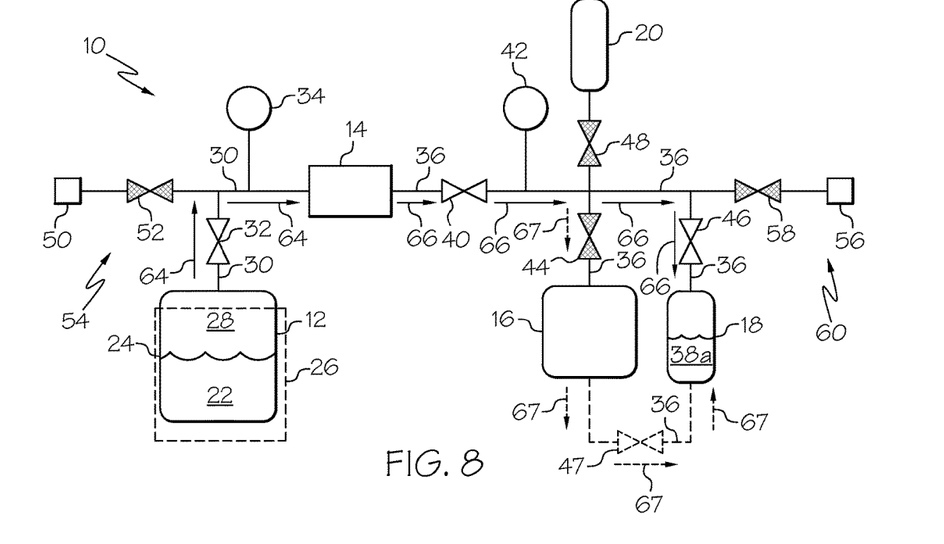
FIG. 8 is a schematic illustration of the system of FIG. 1 during the flushing operation of FIG. 7.

Referring to FIG. 7 and with reference to FIG. 8, the disclosed method 100 may continue with the flushing operation 106. The flushing operation 106 may begin with the step of preparing the system 10 for the flushing operation by opening and/or closing portions of the system 10, as shown at block 126. For example, valve 52 may be closed to prevent fluid flow out of the system 10 (e.g., through the test port 50), valve 44 may be closed to prevent fluid flow into the collection tank 16, valve 48 may be closed to prevent fluid flow and/or mass transfer from the corrosion inhibitor dispenser 20 and valve 58 may be closed to prevent fluid flow out of the system 10 (e.g., through the vacuum port 56). Valve 32 may be opened to allow fluid flow from the storage tank 24, valve 40 may be opened to allow fluid flow through the vapor transfer line 30, the condenser 14 and the liquid transfer line 36 and valve 46 may be opened to allow fluid flow into the flush tank 18.

As shown at block 128, the liquid ammonia source 12 may be provided. The liquid ammonia source 12 may be any source of liquid ammonia 22. The liquid ammonia 22 may be of any quality or purity. For example, the liquid ammonia 22 may be any commercially available liquid ammonia having a purity of approximately between 99 percent and 99.9994 percent. The liquid ammonia 22 may be stored in the storage tank 24.

As shown at block 130, the liquid ammonia source 12 may be heated. For example, a heater 26 may be thermally coupled to the storage tank 24. The heater 26 may be any suitable heating mechanism. For example, the heater 26 may be a removable heating jacket positioned around at least a portion of an exterior of the storage tank 24.

The heater 26 may increase the temperature of the liquid ammonia 22 stored within the interior volume of the storage tank 24 to a temperature suitable to evaporate the liquid ammonia 22 and provide ammonia vapor 28. For example, the heater 26 may increase the temperature of the liquid ammonia 22 to approximately between 25° C. and 75° C. As the liquid ammonia 22 evaporates, any particulate material in the liquid ammonia 22 may remain in the storage tank 24.

Additionally, the heater 26 may also increase the pressure within the storage tank 24. For example, the pressure within the storage tank 24 may increase to approximately 10 to 20 standard atmospheres (atm) of pressure. The increased pressure within the storage tank 24 may provide a force (e.g., pressure) to drive the ammonia vapor 28 through the system 10 (e.g., through the vapor transfer line 30, through the condenser 14 and through the liquid transfer line 36).

As shown at block 132, at least a portion of the system 10 may be heated. For example, the vapor transfer line 30 may be heated to reduce or substantially eliminate condensation of ammonia vapor 28 on the wetted surfaces (e.g., the internal contact surfaces of the vapor transfer line 30).

As shown at block 134, ammonia vapor 28 may be provided. For example, a first portion of the liquid ammonia 22 of the liquid ammonia source 12 (e.g., the liquid ammonia 22 within the storage tank 24) may be evaporated into ammonia vapor 28 and condensed to form the flushed portion of the liquid anhydrous ammonia 38a. In an example construction, the ammonia vapor 28 may flow out of the storage tank 24 (e.g., via the increased pressure within the storage tank 24) and into the condenser 14 through the vapor transfer line 30, as illustrated by directional arrows 64 (e.g., ammonia vapor path).

As shown at block 136, the ammonia vapor 28 may be condensed (e.g., by the condenser 14) into liquid anhydrous ammonia (e.g., the flushed portion of the liquid anhydrous ammonia 38a).

As shown at block 138, the flushed portion of the liquid anhydrous ammonia 38a may be collected in the flush tank 18. In an example construction, the flushed portion of the liquid anhydrous ammonia 38a may flow out of the condenser 14 and into the flush tank 18 through the liquid transfer line 36, as illustrated by directional arrows 66 (e.g., flushed portion of the liquid anhydrous ammonia path).

The flushed portion of the liquid anhydrous ammonia 38a may provide an internal pre-cleaning function to the system 10. The system 10 may utilize the inherent cleaning characteristics of the flushed portion of the liquid anhydrous ammonia 38a (e.g., condensed ammonia fluid) to solubilize intrinsic contaminants within the system 10.

The flushed portion of the liquid anhydrous ammonia 38a may include the liquid anhydrous ammonia (e.g., the distillate) from the condenser 14 formed by up to approximately the first 10 percent of the evaporated liquid ammonia 22 (e.g., ammonia vapor 28 leaving the storage tank 24). The flushed portion of the liquid anhydrous ammonia 38a may include substantially all of any initial impurities and/or contamination in the liquid anhydrous ammonia (e.g., from a first portion of the ammonia vapor 28) and any contamination collected from within the system 10.

As shown at block 140, the flushed portion of the liquid anhydrous ammonia 38a collected in the flush tank 18 may be discarded.

In another example construction (shown in broken lines), the collection tank 16 and the flush tank 18 may be arranged in an inline configuration. In such a construction, the collection tank 16 may also be pre-cleaned during the flushing operation 106. During the step of preparing the system 10 for the flushing operation, as shown at block 126 (FIG. 7), valve 44 may be opened to allow fluid flow into the collection tank 16. At least one additional valve 47 may be connected to the liquid transfer line 36 between the collection tank 16 and the flush tank 18 and opened to allow fluid flow through the collection tank 16 and into the flush tank 18.

The flushed portion of the liquid anhydrous ammonia 38a may be collected in the flush tank 18. For example, the flushed portion of the liquid anhydrous ammonia 38a may flow out of the condenser 14, through the collection tank 16 and into the flush tank 18 through the liquid transfer line 36, as illustrated by directional arrows 67 (e.g., flushed portion of the liquid anhydrous ammonia path).

Figure 9:
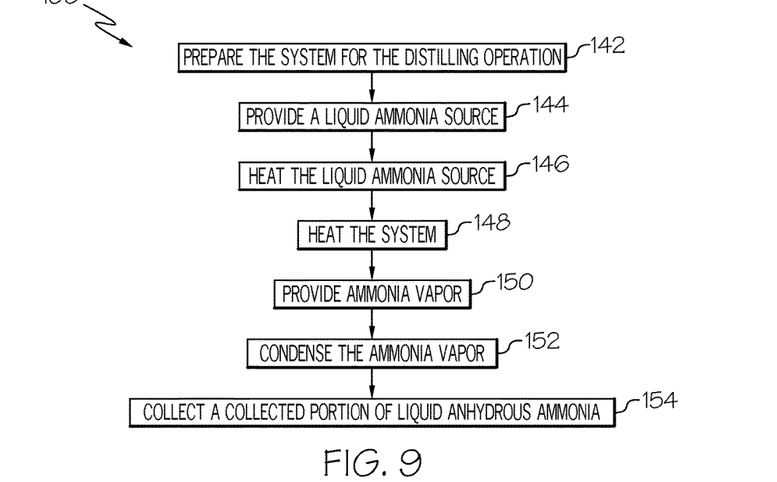
FIG. 9 is a block diagram illustrating an example implementation of the distilling operation of the method of FIG. 2.
Figure 10:
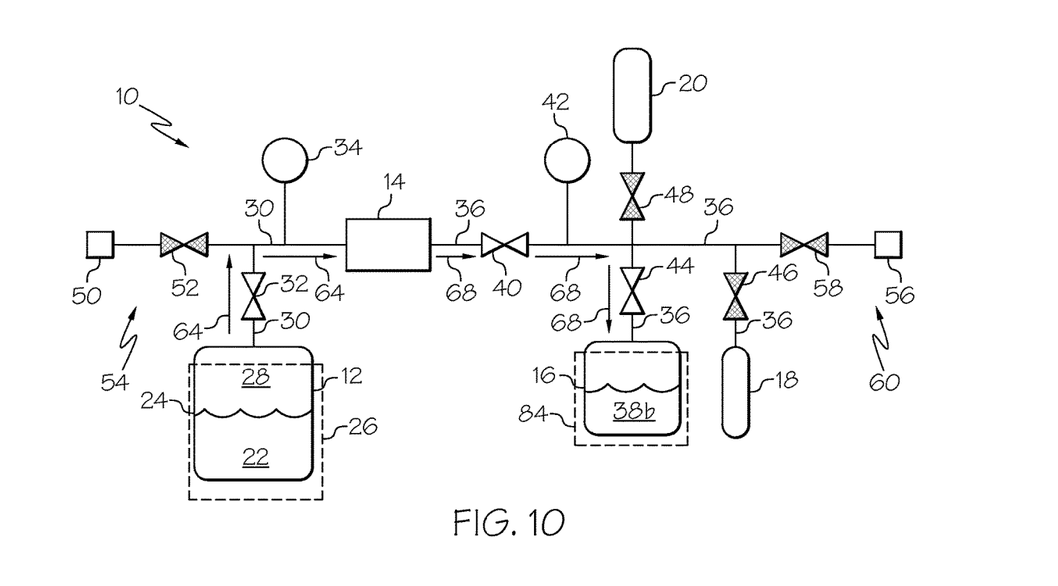
FIG. 10 is a schematic illustration of the system of FIG. 1 during the distilling operation of FIG. 9.

Referring to FIG. 9 and with reference to FIG. 10, the disclosed method 100 may continue with the distilling operation 108. The distilling operation 108 may begin with the step of preparing the system 10 for the distilling operation by opening and/or closing portions of the system 10, as shown at block 142. For example, valve 52 may be closed to prevent fluid flow out of the system 10 (e.g., through the test port 50), valve 46 may be closed to prevent fluid flow into the flush tank 18, valve 48 may be closed to prevent fluid flow from the corrosion inhibitor dispenser 20 and valve 58 may be closed to prevent fluid flow out of the system 10 (e.g., through the vacuum port 56). Valve 32 may be opened to allow fluid flow from the storage tank 24, valve 40 may be opened to allow fluid flow through the vapor transfer line 30, the condenser 14 and the liquid transfer line 36 and valve 44 may be opened to allow fluid flow into the collection tank 16.

As shown at block 144, the liquid ammonia source 12 may be provided. The liquid ammonia source 12 may be the same liquid ammonia source 12 used during the flushing operation 106 (FIGS. 7 and 8).

As shown at block 146, the liquid ammonia source 12 may be heated. For example, the heater 26 (e.g., the removable heating jacket) may be thermally coupled to the storage tank 24.

As shown at block 148, at least a portion of the system 10 may be heated. For example, the vapor transfer line 30 may be heated to reduce or substantially eliminate condensation of ammonia vapor 28 on the wetted surfaces (e.g., the internal contact surfaces of the vapor transfer line 30).

As shown at block 150, ammonia vapor 28 may be provided. For example, a second portion of the liquid ammonia 22 of the liquid ammonia source 12 may be evaporated into ammonia vapor 28 and condensed to form the collected portion of the liquid anhydrous ammonia 38b. In an example construction, the ammonia vapor 28 may flow out of the storage tank 24 (e.g., via the increased pressure within the storage tank 24) and into the condenser 14 through the vapor transfer line 30, as illustrated by directional arrows 64 (e.g., ammonia vapor path).

As shown at block 152, the ammonia vapor 28 may be condensed into liquid anhydrous ammonia (e.g., the collected portion of liquid anhydrous ammonia 38b).

As shown at block 154, the collected portion of the liquid anhydrous ammonia 38b may be collected in the collection tank 16. In an example construction, the collected portion of the liquid anhydrous ammonia 38b may flow out of the condenser 14 and into the collection tank 16 through the liquid transfer line 36, as illustrated by directional arrows 68 (e.g., collected portion of liquid anhydrous ammonia path).

The collected portion of the liquid anhydrous ammonia 38b may include liquid anhydrous ammonia distilled from the portion of the liquid ammonia 22 remaining in the storage tank 24 following the flushing operation 106 (FIGS. 7 and 8). In an example implementation of the disclosed method 100 (e.g., the flushing operation 106 and the distilling operation 108), up to 90 percent of the liquid ammonia 22 of the liquid ammonia source 12 may be distilled (e.g., evaporated as ammonia vapor 28) and condensed as liquid anhydrous ammonia). The remaining 10 percent of the liquid ammonia 22 may include substantially all of the impurities and/or contamination from the liquid ammonia source 12 following the flushing operation 106 (FIGS. 7 and 8) and the distilling operation 108 (FIGS. 9 and 10). The liquid ammonia 22 remaining in the storage tank 24 may be discarded.

The collected portion of the liquid anhydrous ammonia 38b may include a higher purity (e.g., lower concentration of water and/or contamination) than the liquid ammonia 22 of the liquid ammonia source 12. For example, the collected portion of the liquid anhydrous ammonia 38b collected in the collection tank 16 may have a purity increase of approximately 10 times the purity of the liquid ammonia 22 of the liquid ammonia source 12 following the distilling operation 108. As another example, the collected portion of the liquid anhydrous ammonia 38b collected in the collection tank 16 may have a purity increase of approximately 20 times the purity of the liquid ammonia 22 of the liquid ammonia source 12 following the distilling operation 108. As another example, the collected portion of the liquid anhydrous ammonia 38b collected in the collection tank 16 may have a purity increase of approximately 30 times the purity of the liquid ammonia 22 of the liquid ammonia source 12 following the distilling operation 108.

Optionally, the collected portion of the liquid anhydrous ammonia 38b may be cooled. For example, a chiller 84 may be thermally coupled to the collection tank 16. The chiller 84 may be any suitable chilling mechanism. For example, the chiller 84 may be a removable cooling coil positioned around at least a portion of an exterior of the collection tank 16.

The chiller 84 may decrease the temperature of the collection tank 16 and/or the collected portion of the liquid anhydrous ammonia 38b stored within the interior volume of the collection tank 16 to a temperature suitable to create a partial vacuum within the collection tank 16 and reduce the resistance against the flow of the collected portion of the liquid anhydrous ammonia 38b into the collection tank 16. For example, the chiller 84 may decrease the temperature of the collection tank 16 and/or the collected portion of the liquid anhydrous ammonia 38b to approximately between −70° C. and 10° C.

Figure 11:
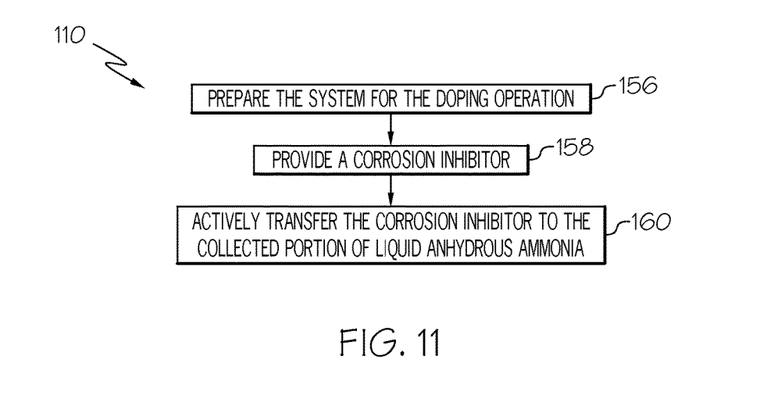
FIG. 11 is a block diagram illustrating an example implementation of the doping operation of the method of FIG. 2.
Figure 12:
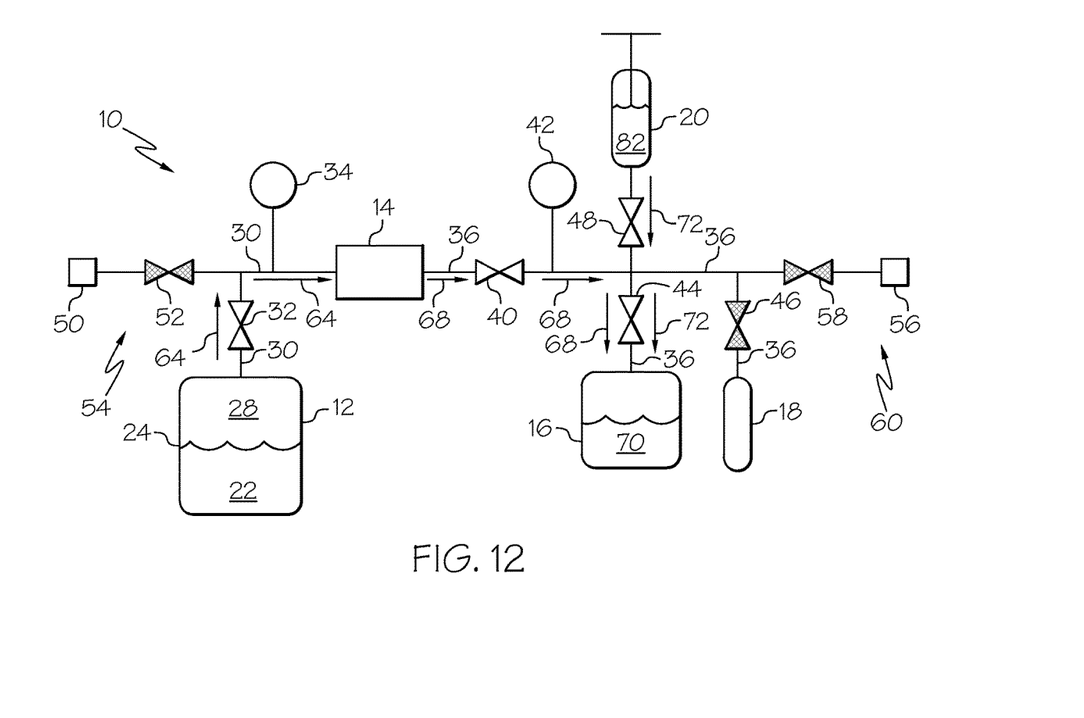
FIG. 12 is a schematic illustration of the system of FIG. 1 during the doping operation of FIG. 11.

Referring to FIG. 11 and with reference to FIG. 12, the disclosed method 100 may continue with the doping operation 110. In an example implementation, the doping operation 110 may include actively dispensing the corrosion inhibitor 82 from the corrosion inhibitor dispenser 20 into the collected portion of the liquid anhydrous ammonia 38b (FIG. 10) to yield corrosion-inhibiting liquid anhydrous ammonia 70.

In an example construction, the corrosion inhibitor dispenser 20 may include an injector mechanism (e.g., a pump) configured to move (e.g., mass transfer) the corrosion inhibitor 82 from the corrosion inhibitor dispenser 20 to the collection tank 16 through a portion of the liquid transfer line 36 or through a separate corrosion inhibitor transfer line (not shown). In another example construction, the corrosion inhibitor dispenser 20 may include a gravity-drop mechanism whereby opening valve 48 allows the corrosion inhibitor 82 to fall directly into the collected portion of the liquid anhydrous ammonia 38*b* (FIG. 10) to yield corrosion-inhibiting liquid anhydrous ammonia 70. In yet another example construction, the corrosion inhibitor dispenser 20 may include a gravity-drop mechanism whereby opening valve 48 allows the corrosion inhibitor 82 to fall directly into the collection tank 16 prior to introduction of the collected portion of the liquid anhydrous ammonia 38*b* to yield corrosion-inhibiting liquid anhydrous ammonia 70.

The doping operation 110 may begin with the step of preparing the system 10 for the doping operation by opening and/or closing portions of the system 10, as shown at block 156. For example, valve 52 may be closed to prevent fluid flow out of the system 10 (e.g., through the test port 50), valve 46 may be closed to prevent fluid flow into the flush tank 18 and valve 58 may be closed to prevent fluid flow out of the system 10 (e.g., through the vacuum port 56). Valve 32 may be opened to allow fluid flow from the storage tank 24 and into the vapor transfer line 30, valve 40 may be opened to allow fluid flow through the condenser 14 and into the liquid transfer line 36, valve 48 may be opened to allow mass transfer of the corrosion inhibitor 82 from the corrosion inhibitor dispenser 20 and valve 44 may be opened to allow fluid flow of the collected portion of the liquid anhydrous ammonia 38*b* and mass transfer of the corrosion inhibitor 82 into the collection tank 16.

As shown at block 158, the corrosion inhibitor 82 may be provided. For example, the corrosion inhibitor 82 may be stored within the corrosion inhibitor dispenser 20. In an example construction, the corrosion inhibitor dispenser 20 and valve 48 may be a single unit connected directly to the system 10. The corrosion inhibitor dispenser 20 may come pre-staged or pre-loaded with the corrosion inhibitor 82. In another example construction, the corrosion inhibitor dispenser 20 may include a staging or loading mechanism (not shown) that allows the corrosion inhibitor 82 to be loaded within the corrosion inhibitor dispenser 20, for example, additional valves, pressure gauges and the like.

As shown at block 160, the corrosion inhibitor 82 may be actively transferred to (e.g., injected or dropped into) the collected portion of the liquid anhydrous ammonia 38*b* (FIG. 10). In an example construction, the collected portion of the liquid anhydrous ammonia 38*b* may flow out of the condenser 14 and into the collection tank 16 through the liquid transfer line 36, as illustrated by directional arrows 68 (e.g., collected portion of liquid anhydrous ammonia path) and the corrosion inhibitor 82 may flow out of the corrosion inhibitor dispenser 20 and into the collection tank 16 through a portion of the liquid transfer line 36, as illustrated by directional arrows 72 (e.g., corrosion inhibitor path).

Figure 13:
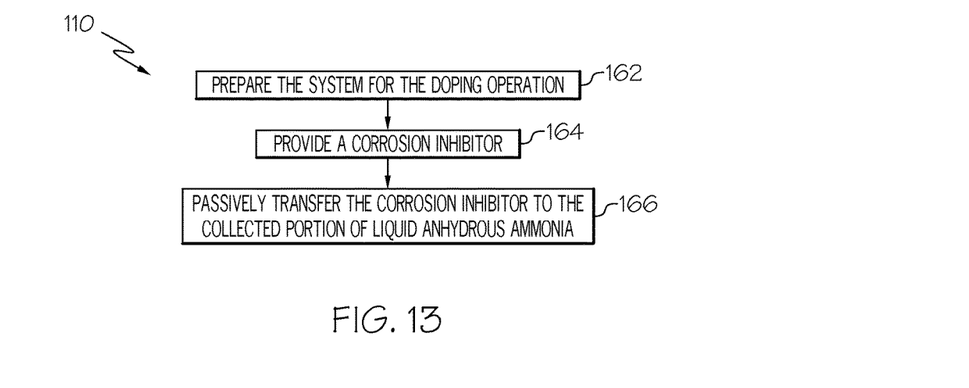
FIG. 13 is a block diagram illustrating another example implementation of the doping operation of the method of FIG. 2.
Figure 14:
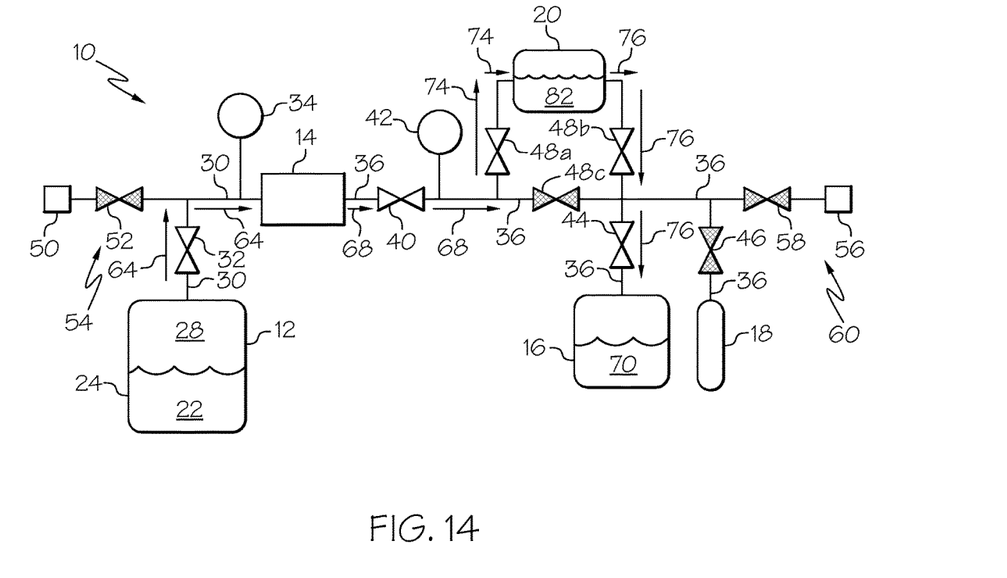
FIG. 14 is a schematic illustration of the system of FIG. 1 during the doping operation of FIG. 13.

Referring to FIG. 13 and with reference to FIG. 14, in another example implementation, the doping operation 110 may include passively dispensing the corrosion inhibitor 82 from the corrosion inhibitor dispenser 20 into the collected portion of the liquid anhydrous ammonia 38*b* (FIG. 10) to yield corrosion-inhibiting liquid anhydrous ammonia 70.

The corrosion inhibitor dispenser 20 may include a mixing mechanism (e.g., a mixing chamber) configured to mix the corrosion inhibitor 82 with the collected portion of the liquid anhydrous ammonia 38*b* (FIG. 10) from the corrosion inhibitor dispenser 20.

The doping operation 110 may begin with the step of preparing the system 10 for the doping operation by opening and/or closing portions of the system 10, as shown at block 162. For example, valve 52 may be closed to prevent fluid flow out of the system 10 (e.g., through the test port 50), valve 46 may be closed to prevent fluid flow into the flush tank 18, valve 48*c* may be closed to prevent fluid flow directly into the collection tank 16 and valve 58 may be closed to prevent fluid flow out of the system 10 (e.g., through the vacuum port 56). Valve 32 may be opened to allow fluid flow from the storage tank 24 and into the vapor transfer line 30, valve 40 may be opened to allow fluid flow through the condenser 14 and into the liquid transfer line 36, valve 48*a* may be opened to allow fluid flow into the corrosion inhibitor dispenser 20, valve 48*b* may be opened to allow fluid flow from the corrosion inhibitor dispenser 20 and valve 44 may be opened to allow fluid flow into the collection tank 16.

As shown at block 164, the corrosion inhibitor 82 may be provided. For example, the corrosion inhibitor 82 may be stored within the corrosion inhibitor dispenser 20. In an example construction, the corrosion inhibitor dispenser 20 and valves 48*a*, 48*b*, 48*c* may be a single unit connected directly to the system 10. The corrosion inhibitor dispenser 20 may come pre-staged or pre-loaded with the corrosion inhibitor 82. In another example construction, the corrosion inhibitor dispenser 20 may include a staging or loading mechanism (not shown) that allows the corrosion inhibitor 82 to be loaded within the corrosion inhibitor dispenser 20, for example, additional valves, pressure gauges and the like.

As shown at block 166, the corrosion inhibitor 82 may be passively transferred to (e.g., mixed with) the collected portion of the liquid anhydrous ammonia 38*b* (FIG. 10). In an example construction, the collected portion of the liquid anhydrous ammonia 38*b* (FIG. 10) may flow out from the condenser 14, as illustrated by directional arrows 68, and into the corrosion inhibitor dispenser 20 through a portion of the liquid transfer line 36, as illustrated by directional arrows 74 (e.g., collected portion of the liquid anhydrous ammonia path). The corrosion inhibitor 82 may be mixed with collected portion of the liquid anhydrous ammonia 38*b* within the corrosion inhibitor dispenser 20 to yield the corrosion-inhibiting liquid anhydrous ammonia 70. The corrosion-inhibiting liquid anhydrous ammonia 70 may flow out of the corrosion inhibitor dispenser 20 and into the collection tank 16 through a portion of the liquid transfer line 36, as illustrated by directional arrows 76 (e.g., corrosion-inhibiting liquid anhydrous ammonia path).

Figure 15:
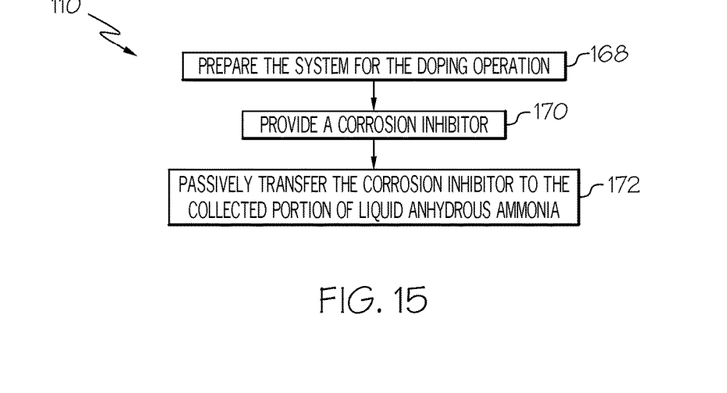
FIG. 15 is a block diagram illustrating another example implementation of the doping operation of the method of FIG. 2.
Figure 16:
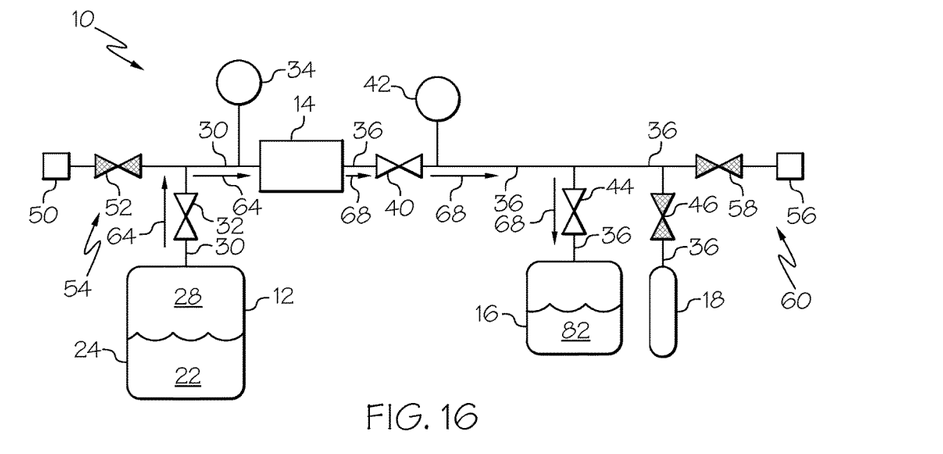
FIG. 16 is a schematic illustration of another embodiment of the disclosed system during the doping operation of FIG. 13.

Referring to FIGS. 15 and 16, in another example implementation, the doping operation 110 may include pre-staging or pre-loading the collection tank 16 with the corrosion inhibitor 82 and adding the collected portion of the liquid anhydrous ammonia 38*b* (FIG. 10) to yield corrosion-inhibiting liquid anhydrous ammonia 70 (not shown in FIG. 16). In this example implementation, the corrosion inhibitor dispenser 20 and associated valves (e.g., valves 48, 48*a*, 48*b*, 48*c*) may not be required.

The doping operation 110 may begin with the step of preparing the system 10 for the doping operation by opening and/or closing portions of the system 10, as shown at block 168. For example, valve 52 may be closed to prevent fluid flow out of the system 10 (e.g., through the test port 50), valve 46 may be closed to prevent fluid flow into the flush tank 18 and valve 58 may be closed to prevent fluid flow out of the system 10 (e.g., through the vacuum port 56). Valve 32 may be opened to allow fluid flow from the storage tank 24 and into the vapor transfer line 30, valve 40 may be opened to allow fluid flow through the condenser 14 and into the liquid transfer line 36 and valve 44 may be opened to allow fluid flow into the collection tank 16.

As shown at block 170, the corrosion inhibitor 82 may be provided. For example, the corrosion inhibitor 82 may be pre-loaded or pre-staged (e.g., in a controlled amount) within the collection tank 16 prior to introduction of the collected portion of the liquid anhydrous ammonia 38b (FIG. 10).

As shown at block 172, the corrosion inhibitor 82 may be passively transferred to (e.g., mixed with) the collected portion of the liquid anhydrous ammonia 38b (FIG. 10) as the collected portion of the liquid anhydrous ammonia 38b is introduced to the collection tank 16 from the condenser 14. In an example construction, the collected portion of the liquid anhydrous ammonia 38b (FIG. 10) may flow out from the condenser 14 and into the collection tank 16 through a portion of the liquid transfer line 36, as illustrated by directional arrows 68 (e.g., collected portion of the liquid anhydrous ammonia path). The collected portion of the liquid anhydrous ammonia 38b may be mixed with the corrosion inhibitor 82 within the collection tank 16 to yield the corrosion-inhibiting liquid anhydrous ammonia 70.

Figure 17:
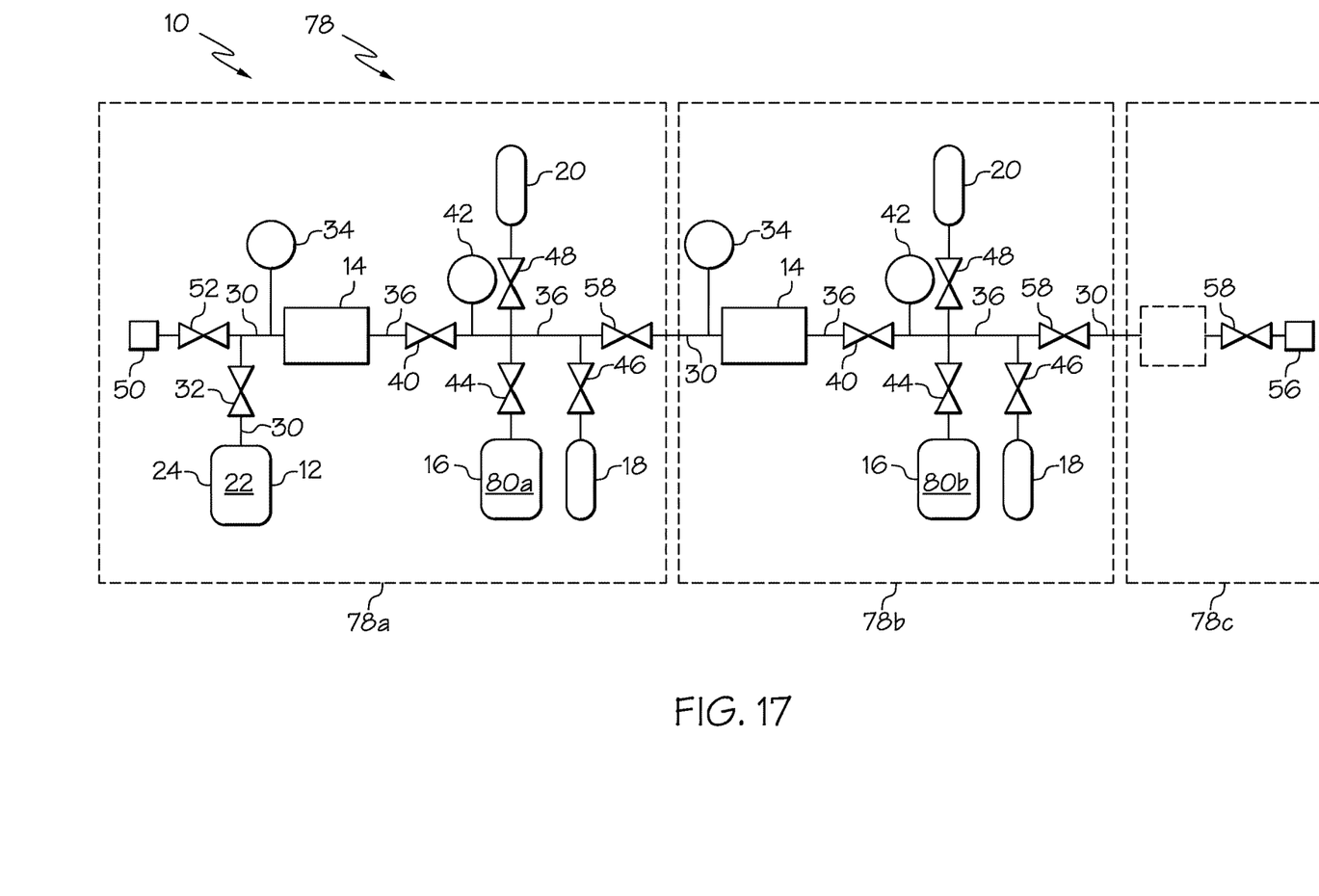
FIG. 17 is a schematic illustration of another embodiment of the disclosed system.

Referring to FIG. 17, in another embodiment, the disclosed system 10 may include a plurality of stages 78 (identified individually as stages 78a, 78b and 78c). The system 10 may include any number of stages 78. The purity of the liquid anhydrous ammonia (or the corrosion-inhibiting liquid anhydrous ammonia) yielded by each stage successive (e.g., 78b or 78c) may be greater than the purity of the liquid ammonia of the preceding stage (e.g., 78a or 78b).

Each stage 78a, 78b and 78c may include a condenser 14, the collection tank 16, the flush tank 18, the corrosion inhibitor dispenser 20, the vapor transfer line 30, the liquid transfer line 36 and various valves (e.g., valves 32, 40, 44, 46, 48, 52, 58) and/or pressure gauges (e.g., pressure gauges 34, 42) similar to those described above. Alternatively, only the final stage (e.g., stage 78c) may include the corrosion inhibitor dispenser 20.

Each stage may include the checking operation 102, the evacuating operation 104, the flushing operation 106, the distilling operation 108 and the doping operation 110 similar to the method 100 described above. The disclosed system 10 may be completely closed (e.g., segregated) to minimize or substantially eliminate cross-contamination between stages 78, to minimize or substantially eliminate cross-contamination between components within each stage 78 and/or minimize or substantially eliminate introduction of environmental contamination into the system 10.

The first stage 78a may include the liquid ammonia source 12 (e.g., liquid ammonia 22 stored in a storage tank 24). The first stage 78a may yield a first liquid anhydrous ammonia 80a (e.g., the collected portion of the liquid anhydrous ammonia condensed by the condenser 14) or a first corrosion-inhibiting liquid anhydrous ammonia (not shown) (e.g., the collected portion of the liquid anhydrous ammonia including the corrosion inhibitor transferred by the corrosion inhibitor dispenser 20) collected in the collection tank 16 of the first stage 78a.

The first liquid anhydrous ammonia 80a may become the liquid ammonia source for the second stage 78b. The second stage 78b may yield a second liquid anhydrous ammonia 80b or a first corrosion-inhibiting liquid anhydrous ammonia (not shown) collected in the collection tank 16 of the second stage 78b.

The second liquid anhydrous ammonia 80b may become the liquid ammonia source for the third stage 78c. The third stage 78c may yield a third liquid anhydrous ammonia (not shown) or a first corrosion-inhibiting liquid anhydrous ammonia (not shown) collected in the collection tank (not shown) of the third stage 78c.

Those skilled in the art will recognize that any number of stages 78 may be incorporated into the disclosed system 10 to yield liquid anhydrous ammonia or corrosion-inhibiting liquid anhydrous ammonia having a desired purity. For example, each stage 78 may increase the purity of the liquid anhydrous ammonia or corrosion-inhibiting liquid anhydrous ammonia by approximately 20 to 30 times the purity of the liquid anhydrous ammonia or corrosion-inhibiting liquid anhydrous ammonia from the preceding stage 78.

It has been observed that the actual partition coefficient achieved from an ammonia distillation process may be significantly less than the partition coefficient expected from an ammonia distillation process. The partition coefficient may be defined as the ratio of the purity of distilled ammonia (e.g., final purity) to the purity of the source ammonia (e.g., initial purity). For example, the actual partition coefficient may be a magnitude of 10 times less than the expected industrial standard partition coefficient. Thus, the number of stages 78 of the disclosed system 10 may be calculated based on this observation.

For example, the disclosed method 100 (FIG. 2) may be repeated through a plurality of stages 78 to distill liquid ammonia 22 and yield liquid anhydrous ammonia having ultra-high purity, while minimizing introduction of environmental contamination. For example, the disclosed system 10 (FIG. 15) and method 100 may reduce moisture (e.g., water content) in liquid anhydrous ammonia to below 0.5 ppm. As another example, the disclosed system 10 may reduce moisture in liquid anhydrous ammonia to below 0.2 ppm. As yet another example, the disclosed system 10 may reduce moisture in liquid anhydrous ammonia to below 0.1 ppm.

Additionally, the doping operation 110 (FIGS. 11-14), as described above, may transfer the corrosion inhibitor 82 (FIG. 1) to the liquid anhydrous ammonia within any single stage or within each individual stage (e.g., only in a final stage) as desired to yield the corrosion-inhibiting liquid anhydrous ammonia. Those skilled in the art will appreciate that adding the corrosion inhibitor 82 to the liquid anhydrous ammonia within at least the first stage 78a may yield corrosion-inhibiting liquid anhydrous ammonia that may substantially reduce the risk corrosion to any metallic components of successive stages 78 of the system 10. Adding the corrosion inhibitor 82 to the liquid anhydrous ammonia within at least the final stage 78c may yield corrosion-inhibiting liquid anhydrous ammonia that may substantially reduce the risk corrosion to any metallic components of secondary systems utilizing the corrosion-inhibiting liquid anhydrous ammonia.

Accordingly, one embodiment of the disclosed system may include a source of liquid ammonia, wherein the liquid ammonia is evaporated to form ammonia vapor, a condenser to condense ammonia vapor into liquid anhydrous ammonia, a flush tank to receive a flushed portion of said liquid anhydrous ammonia, a collection tank to receive a collected portion of said liquid anhydrous ammonia and a corrosion inhibitor transferred to the collected portion of the liquid anhydrous ammonia to form corrosion-inhibiting liquid anhydrous ammonia.

The flushed portion of the liquid anhydrous ammonia may include at least the first 10 percent of the liquid anhydrous ammonia. The collected portion of the liquid anhydrous ammonia may include a purity, and the purity of the collected portion of the liquid anhydrous ammonia is greater than a purity of the liquid ammonia. For example, purity of the collected portion of the liquid anhydrous ammonia may be at least 10 times greater than the purity of said liquid ammonia.

Another embodiment of the disclosed system may include an interconnected plurality of stages, each stage may include a condenser, a flush tank, a collection tank and a corrosion inhibitor dispenser. The collected portion of the liquid anhydrous ammonia collected in each stage of the plurality of stages may be evaporated to form ammonia vapor for a successive stage of the plurality of stages.

One embodiment of the disclosed method may include the steps of: (1) providing a source of liquid ammonia, (2) evaporating the liquid ammonia to form ammonia vapor, (3) condensing the ammonia vapor to form liquid anhydrous ammonia, (4) discarding a flushed portion of the liquid anhydrous ammonia, (5) collecting a collected portion of the liquid anhydrous ammonia and (6) transferring a corrosion inhibitor to the collected portion of the liquid anhydrous ammonia to form corrosion-inhibiting liquid anhydrous ammonia. The collected portion of the liquid anhydrous ammonia may include a purity, and the purity of the liquid anhydrous ammonia may be greater than a purity of the liquid ammonia.

Another embodiment of the disclosed method may include the additional steps of: (7) evaporating the collected portion of the liquid anhydrous ammonia to form subsequent ammonia vapor, (8) condensing the subsequent ammonia vapor to form subsequent liquid anhydrous ammonia, (9) discarding a flushed portion of the subsequent liquid anhydrous ammonia and (10) collecting a collected portion of the subsequent liquid anhydrous ammonia. The collected portion of the subsequent liquid anhydrous ammonia may include a purity, and the purity of the collected portion of the subsequent liquid anhydrous ammonia may be greater than the purity of the collected portion of the liquid anhydrous ammonia.

Although various embodiments of the disclosed system and method have been shown and described, modifications may occur to those skilled in the art upon reading the specification. The present application includes such modifications and is limited only by the scope of the claims.

What is claimed is:

1. A method for producing corrosion-inhibiting liquid anhydrous ammonia, said method comprising:
    evaporating said liquid ammonia to form ammonia vapor;
    condensing said ammonia vapor to form liquid anhydrous ammonia;
    transferring a flushing portion, of said liquid anhydrous ammonia, via at least one liquid transfer line to a flush tank, thereby flushing said at least one liquid transfer line; and
    transferring a collection portion, of said liquid anhydrous ammonia, via said flushed at least one liquid transfer line after the transfer of said flushing portion, to a collection tank.

2. The method of claim 1 comprising transferring a corrosion inhibitor to said collection portion of said liquid anhydrous ammonia to form corrosion-inhibiting liquid anhydrous ammonia.

3. The method of claim 2 wherein said corrosion inhibitor comprises at least one of alkaline salt and alkaline hydroxide.

4. The method of claim 1 wherein said collection portion of said liquid anhydrous ammonia has a purity, and wherein said purity of said collection portion of said liquid anhydrous ammonia is greater than a purity of said liquid ammonia.

5. The method of claim 1 wherein said collection portion of said liquid anhydrous ammonia comprises a water content below 10 ppm.

6. The method of claim 1 wherein said flushing portion of said liquid anhydrous ammonia comprises at least a first 10 percent of said liquid anhydrous ammonia condensed from said ammonia vapor.

7. The method of claim 1 comprising:
    evaporating said collection portion of said liquid anhydrous ammonia to form subsequent ammonia vapor;
    condensing said subsequent ammonia vapor to form subsequent liquid anhydrous ammonia;
    discarding a subsequent flushing portion of said subsequent liquid anhydrous ammonia; and
    collecting a subsequent collection portion of said subsequent liquid anhydrous ammonia.

8. The method of claim 7 wherein:
    said subsequent collection portion of said subsequent liquid anhydrous ammonia has a purity,
    said purity of said subsequent collection portion of said subsequent liquid anhydrous ammonia is greater than said purity of said collection portion of said liquid anhydrous ammonia, and
    said subsequent flushing portion of said subsequent liquid anhydrous ammonia comprises at least a first 10 percent of said subsequent liquid anhydrous ammonia condensed from said subsequent ammonia vapor.

9. The method of claim 2 wherein said corrosion inhibitor is actively transferred to said collection portion of said liquid anhydrous ammonia within a collection tank.

10. The method of claim 2 wherein said corrosion inhibitor is passively transferred to said collection portion of said liquid anhydrous ammonia before said collection portion of said liquid anhydrous ammonia is received within a collection tank.

11. The method of claim 2 wherein said corrosion inhibitor is passively transferred to said collection portion of said liquid anhydrous ammonia within a collection tank.

12. The method of claim 1 further comprising applying a vacuum to at least said at least one liquid transfer line before transferring said flushing portion of said liquid anhydrous ammonia via said at least one liquid transfer line.

13. The method of claim 1 further comprising heating at least a portion of the system to evaporate any liquid ammonia disposed in said at least one liquid transfer line before transferring said flushing portion of said liquid anhydrous ammonia via said at least one liquid transfer line.

14. The method of claim 13 further comprising applying a vacuum to at least said at least one liquid transfer line to remove said evaporated liquid ammonia disposed in said at least one liquid transfer line before transferring said flushing portion of said liquid anhydrous ammonia via said at least one liquid transfer line.

15. The method of claim 1 where said at least one liquid transfer line includes polished stainless steel tubing.

16. A method for producing corrosion-inhibiting liquid anhydrous ammonia, said method comprising:
    providing a source of liquid ammonia;
    evaporating said liquid ammonia to form ammonia vapor;
    condensing said ammonia vapor to form liquid anhydrous ammonia;
    transferring at least a collection portion of said liquid anhydrous ammonia via at least one liquid transfer line to a collection tank coupled to the at least one liquid transfer line; and
    transferring an alkaline corrosion inhibitor to said collection portion of said liquid anhydrous ammonia to form corrosion-inhibiting liquid anhydrous ammonia.

17. The method of claim 16 wherein said alkaline corrosion inhibitor comprises at least one of alkaline salt and alkaline hydroxide.

18. The method of claim 16 further comprising applying a vacuum to at least said at least one liquid transfer line before transferring said at least said collection portion of said liquid anhydrous ammonia via said at least one liquid transfer line.

19. The method of claim 16 further comprising heating at least a portion of the system to evaporate any liquid ammonia disposed in said at least one liquid transfer line before transferring said at least said collection portion of said liquid anhydrous ammonia via said at least one liquid transfer line.

20. The method of claim 19 further comprising applying a vacuum to at least said at least one liquid transfer line to remove said evaporated liquid ammonia disposed in said at least one liquid transfer line before transferring said at least said collection portion of said liquid anhydrous ammonia via said at least one liquid transfer line.

* * * * *